United States Patent [19]

Venkataswamy et al.

[11] Patent Number: 6,005,052
[45] Date of Patent: Dec. 21, 1999

[54] STAGED CONDENSATION, DYNAMIC VULCANIZATION PROCESS FOR MAKING A SUBSTANTIALLY UNPLASTICIZED PLASTIC/RUBBER BLEND

[75] Inventors: Krishna Venkataswamy, Akron; Craig Allen Chmielewski, Medina, both of Ohio

[73] Assignee: Advanced Elastomer Systems, L.P., Akron, Ohio

[21] Appl. No.: 09/083,545

[22] Filed: May 22, 1998

Related U.S. Application Data

[63] Continuation-in-part of application No. 08/686,782, Jul. 26, 1996, Pat. No. 5,783,631, and a continuation-in-part of application No. 08/686,798, Jul. 26, 1996, Pat. No. 5,777,633.

[51] Int. Cl.$^6$ ..................................................... C08L 33/08
[52] U.S. Cl. .......................... 525/166; 525/176; 525/179; 525/182; 525/183; 525/194
[58] Field of Search ..................................... 525/166, 176, 525/179, 183, 182, 194

[56] References Cited

U.S. PATENT DOCUMENTS

| | | | |
|---|---|---|---|
| 5,589,544 | 12/1996 | Horrion | 525/176 |
| 5,777,033 | 7/1998 | Venkataswamy et al. | 525/182 |
| 5,783,631 | 7/1998 | Venkataswamy | 525/92 |

*Primary Examiner*—Margaret G. Moore
*Attorney, Agent, or Firm*—Alfred D. Lobo; William A. Skinner

[57] ABSTRACT

This invention describes a staged process in which successive dynamic vulcanizations of plural curable rubber blend components are based on condensation reactions of a functional group (reactive site) carried by each curable rubber. The process is carried out in three stages during each of which gases evolved during the condensation reactions are removed. It is essential to form an intermediate fully dense hard blend in the second stage. This intermediate hard blend contains a relatively large amount of plastic (relative to curable rubbers) and is therefore much harder than the desired final blend. In the third stage, additional rubber and curative for uncured rubber are added to achieve the desired softness. This process, carried out in an extruder, results in fully dense pellets which are injection moulded to produce articles having essentially the same specific gravity as that of the pellets.

14 Claims, 1 Drawing Sheet

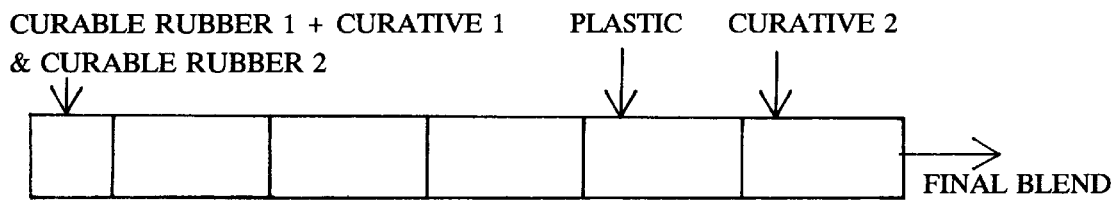
FIG. 1 - PRIOR ART - FINAL BLEND MADE IN TWO STAGES
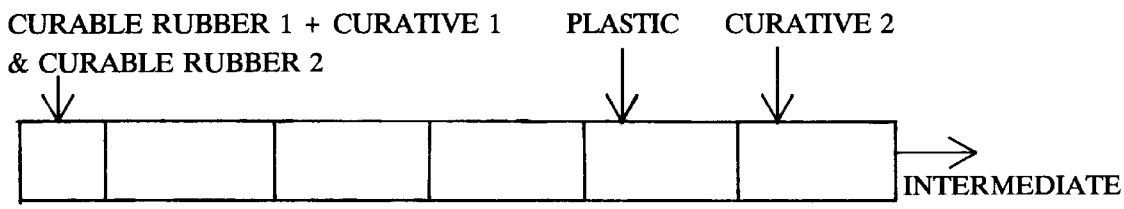
FIG. 2A - INTERMEDIATE HARD BLEND MADE IN TWO STAGES
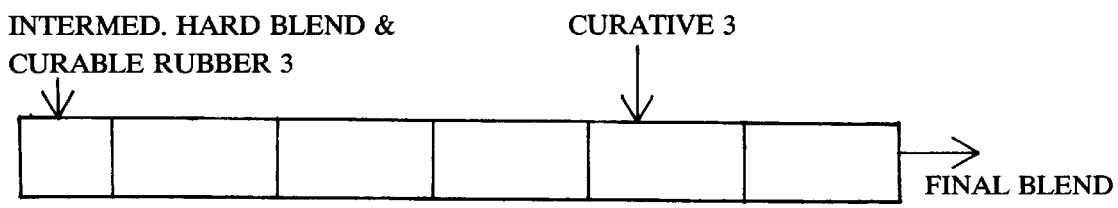
FIG. 2B - FINAL BLEND MADE IN THIRD STAGE

STAGED CONDENSATION, DYNAMIC VULCANIZATION PROCESS FOR MAKING A SUBSTANTIALLY UNPLASTICIZED PLASTIC/RUBBER BLEND

CROSS-REFERENCE TO RELATED APPLICATIONS

This application is a continuation-in-part of applications Ser. No. 08/686,782 now U.S. Pat. No. 5,783,631 and Ser. No. 08/686,798 now U.S. Pat. No. 5,777,633, filed concurrently on Jul. 26, 1993.

FIELD OF THE INVENTION

Polymer blends having a combination of elastic and thermoplastic properties, referred to as "thermoplastic vulcanizates" or "TPVs" (also referred to in the past as "thermoplastic elastomers" or "TPEs") are made by dynamic vulcanization to provide desired hardness/softness, oil and temperature resistance, oxidation resistance, and processability, inter alia. In thermoplastic elastomers which are not physical blends, the properties depend on the relative amounts of "hard" and "soft" phases provided by each component, and the properties of each component. To be of commercial value, the hard phase is typically provided by a readily available engineering thermoplastic resin, familiarly referred to as a "plastic" for brevity. Most commonly the plastic is chosen from polyesters, polyamides and polyolefins which provide a continuous phase of the hard phase in which dispersed domains of the "soft" phase of an elastomer are present. TPVs with a polyolefin are not the subject of this invention which is directed to TPVs of other "plastics", which in combination with a vulcanizable (hereafter "curable" for brevity) rubber, provide relatively "soft" blends of controlled hardness less than 30 Shore D. Such blends are exceptionally resistant to oil swelling, and to compression set.

The Problem

There is a market need for blends of polar engineering thermoplastics containing a dispersed "polar rubber" phase and a continuous "plastic" phase, wherein the "rubber" phase is present in a major proportion by weight relative to the "plastic" phase, and the blend has low oil swell and a hardness in the range from 30 Shore A to 30 Shore D; specifically, for a blend having from 60 to 90 Shore A. Such "polar rubber/plastic" blends of a polyamide and an acrylate rubber, or, of a polyester and an acrylate rubber, are too viscous to be processed in conventional equipment, yet do not lend themselves to substantial plasticization if a practical blend is to be prepared; that is, the blend is unusable if it contains more than 30 parts by weight of plasticizer. By "unusable" is meant that plasticizer exudes from the blend at processing temperature, typically 250° C., and may do so even at ambient temperature. Usable pellets should have a specific gravity in the range from 0.9 to 1.2, without being porous (or spongy), particularly as evidenced by high moisture content despite an extended period over which the pellets are dried. In particular, blends with a polyolefin may be heavily plasticized, yet be of great value. However, vulcanized blends of acrylate rubbers with nylon, PBT and numerous other non-polyolefins do not yield desirable products unless they are substantially free of plasticizer or compatibilizer. By "substantially free" is meant that the blend contains less than 30 parts plasticizer per 100 parts of rubber. When a curable acrylate rubber is present in a major proportion by weight (that is, "rubber-rich"), prior art processes yield an undesirable, porous blend. Acrylate rubbers which include a repeating unit derived from a monoolefinically unsaturated monomer which does not have a curable functional group (or reactive site), e.g. ethylenemethyl acrylate copolymer, are not "curable rubbers" as the term is used herein. The challenge is to provide a process which makes a fully dense but desirably soft rubber-rich blend with a minor proportion by weight of "plastic phase" and a major portion of "cured rubber phase", which blend has excellent tensile strength, compression set, and oil swell resistance. By "fully dense" is meant that it has essentially no measurable porosity; if pelleted, the specific gravity of a pellet is the same as that of an article molded from the pellets.

BACKGROUND OF THE INVENTION

Blends which are polar have been made by dynamic vulcanization using a condensation reaction with the evolution of a small molecule, but such a reaction is relatively slow, compared to the addition dynamic vulcanization of an olefinic rubber and a polyolefin thermoplastic. The condensation reaction cannot be carried out in the presence of enough plasticizer to facilitate blending the components at a temperature below which the physical properties of the blend will be affected deleteriously. If the evolved small molecule is not disposed of, it becomes trapped in the blend resulting in a spongy mass. Therefore such blends are preferably made in a substantially continuous process with adequate venting, because it is impractical, adequately to seal a batch mixer such as a Banbury, for staged addition of components and removal of products of reaction, while it operates at the required temperature in the range from about 200° C. to 275° C.; and it is generally too costly to prepare a blend in separate and distinct stages using an elongated mixing-reaction zone which is relatively short, and pelletizing the dynamically vulcanized blend at each stage before introducing the pellets to the next stage.

Though a barrel of a continuous mixer or mixer-extruder is available in different lengths, commercially available barrels have a length (L) to diameter (D) ratio no greater than 80; they are typically in the range from about 20 to 80. Therefore, for all practical purposes, a continuous process for making the blend must be completed within a barrel having a L/D no more than 80; and, if the barrel has a L/D closer to 20, the process may have to be carried out in two or more separate stages, provided means for removing small molecules evolved due to successive condensation reactions, are provided.

Processes for making blends with non-polyolefinic "plastics" are taught in U.S. Pat. No. 5,589,544 to Horrion and in copending patent applications Ser. Nos. 08/686,782 now U.S. Pat. Nos. 5,783,631 and 08/686,798 now U.S. Pat. No. 5,777,033 filed Jul. 26, 1996. By "non-polyolefinic" plastic is meant that the plastic is substantially free of polyolefin chains. The term "plastic" refers to a resin selected from the group consisting of polyamides, polycarbonates, polyesters, polysulfones, polylactones, polyacetals, acrylonitrile-butadiene-styrene (ABS), polyphenylene oxide (PPO), polyphenylene sulfide (PPS), styrene-acrylonitrile (SAN), polyimides, styrene-maleic anhydride (SMA) and aromatic polyketones, any of which may be used by itself or in combination with another. Most preferred engineering thermoplastic resins are polyamides and polyesters.

In the Horrion '544 patent, in the first stage, a cured rubber concentrate (CRC) is prepared which, in a second stage, is subsequently blended with an engineering thermoplastic, optionally with a compatibilizer. The CRC is formed from a mixture of a curable elastomeric acrylic copolymer ("rubber") and an acrylic "polymeric carrier" which does not react with a curative for the rubber; and the rubber is immiscible with the polymeric carrier.

Referring to FIG. 1, there is schematically illustrated the mixing (vented) barrel of an extruder in which the two stages of the '544 process are continuously carried out. Into the first stage of the extruder is fed a mixture of curable rubber 1 and curable rubber 2 (referred to as the "carrier"), along with a curative for curable rubber 1, optionally with additives which may include a compatibilizer, and the mixture dynamically vulcanized ('544 text bridging col 7 line 51 and col 8 line 11). The CRC (Blend A) is formed because only curable rubber 1 is cured. In the second stage, the CRC is blended with plastic and additional additives and compatibilizer, if necessary (col 8, lines 57–67); the carrier may be crosslinked while mixing with the plastic using a curative different from the one used for curing the curable rubber (cot 9, lines 1–5). However, the plastic blend (Blend H) formed directly in the second stage, as described by Horrion, is susceptible to porosity. Porous (spongy) pellets of Blend H trap water in the pelletization step, and are difficult to handle in subsequent processing steps. It is impractical to dry such wet pellets prior to subsequent processing. The pellets trap water which results in pellets unsuitable for injection molding, when the blend is made in the desired plastic to rubber ratio, using an extruder, to make relatively soft TPVs.

The '798 application teaches a process in which a first curable acrylic rubber and a curable terpolymer are vulcanized in the presence of a curing agent and plastic, to form a blend which has a single low temperature brittle (LTB) point. The '782 application teaches a process in which at least first and second acrylic curable rubbers, each with a different functional group, are cross-linked in plastic, substantially without benefit of a curing agent. The curable rubbers are compatible with each other and also with the engineering plastic. By "compatible" is meant that the rubbers form a mixture in which a second phase can co-exist with the continuous phase without the use of a compatibilizer or a surface active agent. Typical acrylic rubbers have an $C_1$–$C_{10}$ alkyl group in combination with one or more groups chosen from $C_2$–$C_3$ olefin, carboxyl, hydroxyl, epoxy, halogen, and the like.

No known process utilizes a three-stage process including sequential first and second condensation reactions, the first to form an intermediate hard blend with a first curable acrylic rubber, and the second to form a second cured blend of another curable acrylic rubber within the intermediate hard blend, substantially without using a plasticizer, so as to result in a final blend having a hardness less than 30 Shore D, preferably less than 90 Shore A. The first curable rubber contains a different functional group from that of the second curable rubber.

As seen by the comparative illustrative example provided herebelow, a blend made by the two-step process taught by the Horrion '544 patent has surprisingly different properties, though the '544 blend has the same components present in the same relative amounts as in a blend made by the three-step process of this invention.

SUMMARY OF THE INVENTION

It has been discovered that compositions taught in the aforementioned '544 and '798 inventions, including at least two curable rubbers blended with a polar engineering thermoplastic resin ("plastic" for brevity), can be made fully dense and with controlled physical properties, in a three-stage process, including an intermediate processing stage. The key intermediate stage results in the formation of an intermediate hard and fully dense blend, greater than 40 Shore D, in which only the first curable rubber is cured. The intermediate hard blend provides a micro-structure which is susceptible to further controlled modification when, in a third stage, the second curable rubber is cured.

A three-stage process is provided for blending a plastic with at least two, first and second, polar acrylate rubbers, each having a repeating unit derived from a monoolefinically unsaturated crosslinking monomer, each having a functional group curable by a different curative; that is, each curative is effective for one functional group but not the other. Such repeating units of a crosslinking monomer are capable of crosslinking chains of polymer containing acrylate repeating units, and if present, repeating units of a non-acrylate copolymerizable monomer. Each rubber is cured by successive condensation reactions which discharge small molecules. It is therefore essential that such small molecules discharged during the curing of the rubbers be concurrently removed from the reaction zone.

The three-stage process requires step-wise vulcanization through successive condensation reactions, and in the first stage, the use of a sufficient amount of a second rubber to yield a dynamically vulcanized blend in which the rubbers are present as separate phases. When only two rubbers are used in the final blend, only a portion of the total amount of second curable rubber which is to be incorporated in the final blend, is used in the first stage. In this first stage, with no plastic present, a first condensation reaction occurs while blending the first curable rubber with the second curable rubber, but only the first curable rubber is cured with a first curative. Any other rubber having a functional group susceptible to the same first curative will also be cured.

Thereafter, in the second stage, in the presence of the plastic, a second condensation reaction occurs, with a second curative, curing the second curable rubber present, and, if present, any other rubber having a functional group susceptible to the same second curative. The intermediate hard blend thus formed is fully dense and has a hardness of at least 40 Shore D and may be as high as Shore D 80.

In the third stage, enough additional curable rubber ("third rubber") and additional curative ("third curative") is introduced, preferably in combination with the cured first and uncured second rubbers, to provide a desirable essentially fully dense final blend. The third rubber has a functional group which is not necessarily different from that of the first or second rubbers. The functional group of the third rubber may be the same as that of the first or second curable rubber, or different from either. When the functional group of the third rubber is the same as that of the second, then the second and third curatives will have the same effect, and may be the same. The third rubber may be a blend of the first and second rubbers and the amounts of the curatives for each chosen depending upon what final properties of the vulcanizate are desired.

Preferably, when only first and second curable rubbers are cured by first and second curatives, whether the process is operated continuously in stages in a single elongated rection zone, or in separate and distinct stages, an additional amount of the second curable rubber and curative for it, is introduced in the third stage, optionally in combination with the cured first rubber, to provide a desirable essentially fully dense final blend.

The blending is preferably carried out in an axially elongated reaction zone, in a continuous single pass if the zone is long enough with concurrent removal of evolved (small molecule) gases from the zone; or, in two separate passes, with concurrent removal of evolved gases in each pass, if the available zone is relatively short. A typical reaction zone has a L/D ratio in the range from about 20 to 80 and produces a novel final blend having controlled hardness in the range from about 30 Shore A to 30 Shore D, preferably 40 Shore A to 90 Shore A, substantially in the absence of a plasticizer, which is typically a processing oil. The L/D ratio and the choice of components of the final blend will generally dictate whether the process for forming the blend may be continuous, or staged in separate stages.

More specifically, a three-stage vulcanizate is prepared by a first condensation reaction of a first rubber effected with a first curative, in the presence of an initial portion of a second rubber not affected by the first curative; preferably the relative amounts of first and second rubbers used in the first stage condensation range from 1:2 to 2:1. The first condensation results in evolution of a first small molecule, e.g. HCl or water, and formation of a first-stage vulcanizate. In a second stage, the second rubber is cured by a second curative in the presence of a plastic, in a second condensation reaction which results in evolution of a second small molecule and the formation of an intermediate hard and fully dense blend having a hardness of at least 40 Shore D, preferably from 40 to 80 Shore D. The plastic is a minor proportion by weight of the total amount of first and second rubbers used in the intermediate hard blend; preferably, in the second stage, the ratio of first and second rubbers (amount by weight) together, relative to the plastic is less than 5, most preferably less than 4 and greater than 1.5. In a third stage, the intermediate hard blend provides the medium in which an additional, controlled amount of additional curable rubber is cured in a further condensation reaction with additional curative, to yield the desired, final, "soft" blend; preferably, in the third stage, the ratio of first, second and the additional rubber which may be the same as the second rubber or different, together, relative to the plastic is greater than 2, more preferably greater than 3 but less than 5.

Most preferably, the first, second and third stages are carried out sequentially in a mixer-extruder of sufficient length to facilitate completion of all three stages so as to discharge the final blend; however, if limited by an extruder of insufficient length for a continuous process, the vulcanization may be carried out in separate stages by recovering a first-stage vulcanizate preferably in pellets; then, in a second stage, feeding the pellets into the extruder with plastic to make the intermediate hard blend; and thereafter, in a third stage, blending the intermediate hard blend with an additional amount of additional curable acrylate rubber and additional curative. If the additional rubber, that is a third rubber, has a functional group which is to be cured by a third curative different from the first and second curatives, then all rubbers are preferably chosen so as to be compatible with one another. It is most convenient to use an additional amount of the second rubber as the additional (third) rubber, and to use an additional amount of the second curative, preferably in combination with cured first rubber. Since it is desirable to maintain control of the sequential curing of the rubbers, it is undesirable to utilize rubbers with functional groups which react with one another so as to be self-curing.

It is therefore a general object of this invention to provide a three-stage process for making a substantially unplasticized vulcanized blend of a plastic and at least two, first and second, curable acrylate rubbers in which process (i) a first blend of cured first rubber and uncured second rubber is formed; then (ii) an intermediate hard and fully dense blend is formed, the hardness of which is controlled by the total curable rubbers present, that is, the amounts of first and second curable rubbers and plastic in the mixture when the second rubber is vulcanized with a second curative in a second condensation reaction; thereafter, (iii) more of an additional curable rubber, different from the first and second rubbers, or the same as either the first, or the second rubber, or a blend thereof, and additional curative, different from both the first and second curatives, or, the same as either, are added to the intermediate hard blend to react in a third condensation reaction, or continue the second condensation reaction, and yield the final blend. The successive condensation reactions are effected, preferably in the same elongated reaction zone. The properties of the vulcanizate of the first stage are controlled by the relative amounts of the first and second rubbers and conditions of reaction in the first stage; the properties of the intermediate hard blend are controlled by the relative amounts of plastic and second rubber relative to the first curable rubber and conditions of reaction in the second stage; the properties of the final blend are finely tuned by a controlled addition of additional curable rubber, additional curative and conditions of reaction in the third stage.

It is a specific object of this invention to provide a process to produce relatively soft blends of a polyamide, such as Nylon 6 or copolyamide thereof, and acrylate rubbers; and of a polyester such as polybutylene terephthalate (PBT) or copolyester thereof, and acrylate rubbers; which blends have a hardness generally less than shore D 30; a resistance to oil swell less than 10, as measured by ASTM Test D-471; have a resistance to compression set of at least 85 after 70 hr at 150° C.; and, are substantially free of conventional plasticizers or compatibilizers conventionally used to plasticize such prior art blends.

BRIEF DESCRIPTION OF THE DRAWING

The foregoing and additional objects and advantages of the invention will best be understood by reference to the following detailed description, accompanied with schematic illustrations of the prior art and a preferred embodiment of the invention, in which illustrations:

FIG. 1 is a schematic illustration of the prior art Horrion '544 process carried out continuously in two stages in an extruder from which the final blend is recovered.

FIG. 2A is a schematic illustration of the process of this invention carried out continuously in two stages in an extruder from which the intermediate hard fully dense blend is recovered.

FIG. 2B is a schematic illustration of the third stage of the process of this invention carried out by re-extruding the intermediate hard fully dense blend with additional curable rubber and curative for all the uncured rubber.

DETAILED DESCRIPTION OF PREFERRED EMBODIMENTS

Suitable thermoplastic polyamide resins are crystalline or amorphous high molecular weight solid polymers including homopolymers, copolymers and terpolymers having recurring amide units within the polymer chain. Commercially available polyamides having a Tg or melting temperature (Tm) above 100° C. may be used but those having a Tm in the range from 160° C. to about 280° C. are preferred, whether typically used in fiber forming or molding operations. Examples of suitable polyamides are polylactams such as nylon 6, polypropiolactam (nylon 3), polyenantholactam (nylon 7), polycapryllactam (nylon 8), polylaurylactam (nylon 12), and the like; homopolymers of amino acids such as polyaminoundecanoic acid (nylon 11); polypyrrolidinone (nylon 4); copolyamides of a dicarboxylic acid and a diamine such as nylon 6,6; polytetramethyleneadipamide (nylon 4,6); polytetramethyleneoxalamide (nylon 4,2); polyhexamethyleneazelamide (nylon 6,9); polyhexamethylenesebacamide (nylon 6,10); polyhexamethyleneisophthalamide (nylon 6,1); polyhexamethylenedodecanoic acid (nylon 6,12) and the like; aromatic and partially aromatic polyamides; copolyamides such as of caprolactam and hexamethyleneadipamide (nylon 6/6,6), or a terpolyamide, e.g., nylon 6/6,6/6,10; block copolymers such as polyether polyamides; or mixtures thereof. Additional examples of suitable polyamides described in the *Encyclopedia of Polymer Science and Technology*, by Kirk & Othmer, Second Edition, Vol. 11, pages 315–476, are incorporated by reference thereto as if fully set forth herein. Preferred polyamides employed in this invention are nylon 6, nylon 11, nylon 12, nylon 6,6, nylon 6,9, nylon 6,10, and nylon 6/6,6. Most preferred are nylon 6, nylon 6,6, nylon 11, nylon 12 and mixtures or copolymers thereof. The polyamides generally have a number average molecular weight of from about 10,000 to about 50,000, and desirably from about 30,000 to about 40,0000. The amount of polyamide in the blend is generally from about 25 to about 100, desirably from about 30 to about 90, and preferably from about 35 to about 75 parts by weight per 100 parts by weight of total acrylic rubbers.

Suitable thermoplastic polyesters include the various ester polymers such as polyester, copolyester, or polycarbonate, etc., a monofunctional epoxy endcapped derivative thereof, and mixtures thereof. The various polyesters can be either aromatic or aliphatic or combinations thereof and are generally directly or indirectly derived from the reactions of diols such as glycols having a total of from 2 to 6 carbon atoms and desirably from about 2 to about 4 carbon atoms with aliphatic acids having a total of from 2 to 20 carbon atoms and desirably from about 3 to about 15 or aromatic acids having a total of from about 8 to about 15 carbon atoms. Generally, aromatic polyesters are preferred such as polyethyleneterephthalate, polybutyleneterephthalate, polyethyleneisophthalate, polynaphthaleneterephthalate, and the like, as well as endcapped epoxy derivative thereof, e.g., a monofunctional epoxy polybutyleneterephthalate. Various polycarbonates can also be utilized and the same are esters of carbonic acid. A suitable polycarbonate is that based on bisphenol A, i.e., poly(carbonyldioxy-1,4-phenyleneisopropylidene-1,4-phenylene).

The various ester polymers also include block polyesters such as those containing at least one block of a polyester and at least one rubbery block such as a polyether derived from glycols having from 2 to 6 carbon atoms, e.g., polyethylene glycol, or from alkylene oxides having from 2 to 6 carbon atoms. A preferred block polyester is polybutyleneterephthalate-b-polyethylene glycol which is available as Hytrel from DuPont.

Preferably only one plastic from a single generic class is used, e.g. a polyamide or polyester rather than plural plastics, and it is used in a minor proportion relative to the total weight of rubbers in the blend. Preferably the plastic ranges from about 10 to less than 50 parts, more preferably, from about 20 to 40 parts by weight per 100 parts by weight (phr) of the acrylic rubber. A major proportion of plastic in the blend results in a blend having too high a hardness, that is, above 30 Shore D.

The Process

Referring to FIG. 2A there is schematically illustrated an extruder in which the first two stages are successively, continuously carried out. In the first stage, a rubber masterbatch (Blend A) is prepared in which curable rubber 1 is blended with less than the total amount (to be used) curable rubber 2, using curative 1 which cures only the first rubber. The first rubber has a functional group which will condense with a reactive site on an adjacent chain of the same rubber; if plural first rubbers (so termed because they are curable by the same first curative) are used, the condensation reaction proceeds with chains of either, or both (all plural first) rubbers.

The one or more functionalized first and second acrylic rubbers are generally compatible with each other and also with the plastic, particularly if it is a polyamide or polyester.

In the second stage, the rubber masterbatch (Blend A) is blended with a chosen plastic and is cured with a second curative (curative 2). The second curative initiates a second condensation reaction of a functional group on the rubber with a reactive site on an adjacent chain of the same rubber, yielding an intermediate hard fully dense blend; if plural second rubbers are used which are to be cured by the same second curative, the condensation reaction proceeds with chains of either, and both (or all plural second) rubbers.

Referring to FIG. 2B, there is schematically illustrated the extruder in which the third stage is carried out separately, instead of being continuously carried out in the same extruder, because the length of the available extruder's barrel is insufficient to carry out all three stages. The intermediate hard blend (Blend B) recovered from the second stage (in FIG. 2A) is mixed with an additional third rubber (curable rubber 3) and a curative for the third rubber. In this particular embodiment, in which only two rubbers are to be used, and a portion of curable rubber 2 has already been used in the first stage, Blend B is mixed with the remainder of curable rubber 2 and more curative 2, and dynamically vulcanized to yield the final blend. As stated above, in another embodiment, Blend B may be mixed with a blend of both curable rubbers 1 and 2, and additional curatives for each. And in still another embodiment, as shown, Blend B is mixed with curable rubber 3 which is different from both rubbers 1 and 2, and with curative 3 (for rubber 3). The final blend with the desired properties is then obtained.

Preferred curable rubbers are copolymers of two or more of the following monomers, provided at least one monomer has a functional group curable in a condensation reaction: an alkyl acrylate, a lower olefin, and an acrylate with a functional group.

In an alkyl acrylate, alkyl has 1 to 10 carbon atoms, typically 1 to 3. A curable rubber typically includes a repeating unit with a functional group and another repeating unit chosen from ethyl acrylate, butyl acrylate, ethylhexyl acrylate, and the like.

When a repeating unit derived from an olefin is chosen, the olefin preferably has from 2 to 6 carbon atoms; a typical curable rubber may include an ethylene, propylene or butylene repeating unit, the molar ratio of such olefin units to acrylate repeating units typically being less than 2, preferably being in the range from 0.5 to 1.5.

A preferred functional group on each of the two or more acrylic rubbers are chosen from the following: halogen, carboxyl, epoxy, hydroxy.

Suitable comonomers which contribute a pendent carboxylic acid group include $C_2$–$C_{15}$ unsaturated acids, preferably those having from 2 to 10 carbon atoms. Examples of acid functionalized acrylic rubbers include terpolymers of ethyl-ene-acrylate-carboxylic acid such as Vamac G from DuPont, and various carboxyl functional acrylates sold by Nippon-Zeon, inter alia. The proportion (by weight) of a rubber having a repeating unit with a functional group curable in a condensation reaction is less than about 10 mole percent, and preferably from about 0.5 to 4 weight percent, based on the weight of all repeating units.

Suitable comonomers which contribute pendent epoxy groups, include unsaturated oxiranes such as oxirane acrylates wherein the oxirane group has from 3 to about 10 carbon atoms and wherein the ester group of the acrylate is an alkyl having from 1 to 10 carbon atoms with a specific example being glycidyl acrylate. Another group of unsaturated oxiranes are the various oxirane alkenyl ethers wherein the oxirane group has 3 to about 10 carbon atoms and the alkenyl group has from 3 to about 10 carbon atoms with a specific example being allyl glycidyl ether. Examples of epoxy functionalized acrylic rubbers include Acrylate AR-53 and Acrylate AR-31 from Nippon-Zeon, inter alia.

Suitable comonomers which contribute hydroxyl groups include $C_2$–$C_{20}$ unsaturated alcohols, preferably from 2 to 10 carbon atoms. A specific example of a hydroxy functionalized acrylic rubber is Hytemp 4404 from Nippon-Zeon.

A preferred rubber with a functional group is a terpolymer of a $C_2$–$C_3$ olefin, a $C_1$–$C_4$ acrylate and acrylic acid or methacrylic acid. The olefin is present in a range from about 35 to 80 mole percent, preferably from about 45 to 55 mole percent; the acrylate is present in a range from about 10 to about 60 mole percent, preferably from about 37 to about 50 mole percent; and the carboxylic acid is present in a range from about 0.5 to about 10 mole percent, preferably from about 2 to about 8 mole percent. Representative, commercially available terpolymers are Vamac G, Vamac LS, Vamac GLS or Vamac 6796, etc., manufactured by DuPont.

The curing of a rubber in each stage is effected in the presence of an effective amount of one or more curing agents present in an amount sufficient to result in a substantially complete cure of that rubber, namely at least 90 percent, though a lesser degree of cure, as low as about 80 percent may be acceptable. The degree of cure is readily determined by the amount of undissolved acrylic rubber in toluene at 20° C. Suitable crosslinking agents cure each rubber resulting in covalent bonds between reactive groups. It is preferred to use nitrogen-containing crosslinking agents such as amines and preferably compounds containing two nitrogen crosslinking agents such as diamines. Examples of suitable crosslinking agents include various maleimides, various diisocyanates such as toluene diisocyanate, various isocyanate terminated polyester prepolymers, and various polyamines such as methylene dianiline. Additionally, various epoxides such as the diglycidyl ether of bisphenol-A, etc., can be utilized.

Highly preferred curing agents are the amine terminated polyethers exemplified by the Jeffamine ED-series polymers sold by Texaco. Another class of curing agents are the diamine carbamates exemplified by a hexamethylenediamine carbamate such as Diak #1 sold by DuPont.

The amount of curing agent used is generally in the range from about 0.5 to about 12 parts by weight, preferably from about 1 to 5 parts per 100 parts by weight of the particular rubber to be vulcanized.

Optionally, in association with curing agents, accelerators can be utilized to decrease the cure time of the two or more functionalized acrylic rubbers. Suitable accelerators include various salts of fatty acids that do not crosslink the functionalized rubber compounds. Often such compounds also serve as lubricants. The fatty acid salts generally have from 12 or 14 to 20 or 25 carbon atoms. Suitable cations include the alkaline as well as the alkaline earth metals, that is, Groups 1 and 2 of the Periodic Table, as well as the various transitional metals, for example, Groups 11 and 12 of the Periodic Table. Specific examples of accelerators include the sodium, potassium, magnesium, calcium, zinc, etc. salts of fatty acids such as palmitic acid, stearic acid, oleic acid, and the like, and mixtures thereof, with potassium stearate and magnesium stearate being preferred. The amount of the accelerators used is small, up to 10 parts, preferably from about 0.1 to about 4 or 5 parts, most typically, from about 0.5 to about 1.5 parts by weight per 100 parts by weight of the rubber to be cured.

A preferred first rubber is Vamac terpolymer which has a repeating unit with a carboxyl reactive cure site, and a preferred second rubber is an acrylate rubber having a repeating unit with a chloroacetate reactive cure site. Thus, in the first stage, only the carboxyl groups are cured yielding a vulcanizate in which the chloroacetate group is not cured. Though the first stage blend has two Tgs it may or may not have a single low temperature brittle point (LTB) depending upon the specific functional groups of each rubber and the relative amounts of each.

In the second stage, upon addition of the plastic and a curative for the second rubber, a hard blend is formed in which the plastic is the continuous phase.

In the final stage, upon addition of more rubber which is to be cured, along with curative for the rubber, the final blend formed is fully dense and soft.

In the following illustrative examples, all references to "parts" are to "parts by weight".

EXAMPLE 1

A rubber with a carboxyl group, specifically Vamac VMR-6796 which is a terpolymer of ethylene, methyl acrylate, and acrylic acid in a weight ratio of about 50:45:5 is blended with an equal portion by weight of a rubber having a chloroacetate group, specifically Hytemp 4051CG, which is a copolymer of ethyl acrylate and a lower alkyl, $C_1$–$C_4$, vinyl chloroacetate in a weight ratio of about 95:5. The mixture is cured in a Banbury mixer with Diak #1 (hexamethylenediamine carbamate), a curative for the Vamac, with the addition of an inert inorganic or organic filler, while the evolved gases are removed to yield Blend A. Examples of inorganic fillers are calcined clay, titanium dioxide, silica and talc; examples of organic fillers are crushed peanut, cashew shells, cocoanut charcoal, saturated hydrocarbon and fluorocarbon polymers.

67.5 parts of Blend A are mixed with 40 parts Nylon 6 Ultramid B3 and dynamically vulcanized in the presence of a tertiary amine curative (ACM curative Hytemp SC-75), lubricant, processing aid and antioxidant, to produce a hard Blend B which is pelletized and dried for 4 hrs at 230° F. in a desiccant hopper-drier.

50 parts of Blend B are then mixed with 50 parts of Blend A and dynamically vulcanized in the presence of a tertiary amine curative (ACM curative Hytemp SC-75), lubricant/ filler, processing aid and antioxidant, in a twin-screw extruder, to produce a soft Blend C. Blend C yields a plastic/rubber ratio of 20/80 which provides fully dense pellets with unexpectedly good oil swell and compression set properties. The compression set properties given hereunder are based on compression molded plaques.

The components, and relative amounts of each, in Blend A are tabulated below:

| | |
|---|---|
| Vamac, VMR-6796 | 50 |
| Hytemp 4051CG | 50 |
| Vamac Curative, Diak #1 | 0.5 |
| inert organic filler | 12 |
| TOTAL | 112.5 |

The components, and relative amounts of each, in Blend B are tabulated below:

| | |
|---|---|
| Blend A | 112.5 |
| Nylon 6, Ultramid B3 | 66.7 |
| ACM Curative, Hytemp SC-75 | 3.5 |
| inert organic filler | 4. |
| Naugard 445 | 2. |
| Kemamide S221 | 2. |
| TOTAL | 190.7 |

The properties of Blend B are tabulated below:

| | |
|---|---|
| Ultimate Tens. Strength (psi) | 3113 (21.5 MPa) |
| Elongation at Break (%) | 125 |
| 100% Modulus (psi) | 3022 (20.8 MPa) |
| Tension Set (%) | 66 |
| Hardness (Shore A/D) | 59D |
| Oil Swell (%) 70 hrs @ 125° C. | 1.4 |
| Compression Set (%) 70 hrs @ 150° C. | 95.6 |

The components, and relative amounts of each, in Blend C are tabulated below:

| | |
|---|---|
| Blend A | 112.5 |
| Nylon 6, Ultramid B3 | 25. |
| ACM Curative, Hytemp SC-75 | 3.5 |
| inert organic filler | 4. |
| Naugard 445 | 2. |
| Kemamide S221 | 2. |
| Santicizer 79TM | 10. |
| TOTAL | 159. |

The properties of Blend C are tabulated below:

| | |
|---|---|
| Ultimate Tens. Strength (psi) | 1168 (8.1 MPa) |
| Elongation at Break (%) | 155 |
| 100% Modulus (psi) | 953 (6.6 MPa) |
| Tension Set (%) | 26 |
| Hardness (Shore A/D) | 82A |
| Oil Swell (%) 70 hrs @ 125° C. | 4.6 |
| Compression Set (%) 70 hrs @ 150° C. | 83.3 |

EXAMPLE 2

In a manner analogous to that described above for Example 1, the same components are blended in the final soft blend, in the same relative amounts plastic:rubber= 20:80. However, using a lower relative amount of the polyamide in a 30/70 polyamide/rubber mixture to form the intermediate hard blend in stage 2, demonstrates that forming a softer intermediate hard blend results in only a slightly harder final blend, the remaining properties being substantially the same.

The components, and relative amounts of each, in Blend A are tabulated below:

| | |
|---|---|
| Vamac, VMR-6796 | 50 |
| Hytemp 4051CG | 50 |
| Vamac Curative, Diak #1 | 0.5 |
| inert organic filler | 12 |
| TOTAL | 112.5 |

The components, and relative amounts of each, in Blend B are tabulated below:

| | |
|---|---|
| Blend A | 112.5 |
| Nylon 6, Ultramid B3 | 42.9 |
| ACM Curative, Hytemp SC-75 | 3.5 |
| inert organic filler | 4. |
| Naugard 445 | 2. |
| Kemamide S221 | 2. |
| TOTAL | 190.7 |

The properties of Blend B are tabulated below:

| | |
|---|---|
| Ultimate Tens. Strength (psi) | 1962 (13.5 MPa) |
| Elongation at Break (%) | 140 |
| 100% Modulus (psi) | 1781 (12.3 MPa) |
| Tension Set (%) | — |
| Hardness (Shore A/D) | 45D |
| Oil Swell (%) 70 hrs @ 125° C. | 5.3 |
| Compression Set (%) 70 hrs @ 150° C. | 91.5 |

The components, and relative amounts of each, in Blend C are tabulated below:

| | |
|---|---|
| Blend A | 112.5 |
| Nylon 6, Ultramid B3 | 25. |
| ACM Curative, Hytemp SC-75 | 3.5 |
| inert organic filler | 4. |
| Naugard 445 | 2. |
| Kemamide S221 | 2. |
| Santicizer 79TM | 10. |
| TOTAL | 159. |

The properties of Blend C are tabulated below:

| | |
|---|---|
| Ultimate Tens. Strength (psi) | 1170 (8.1 MPa) |
| Elongation at Break (%) | 138 |
| 100% Modulus (psi) | 1010 (7.0 MPa) |
| Tension Set (%) | 27 |
| Hardness (Shore A/D) | 85A |
| Oil Swell (%) 70 hrs @ 125° C. | 5.2 |
| Compression Set (%) 70 hrs @ 150° C. | 75.5 |

EXAMPLE 3

In a manner analogous to that described above for Example 1, the same rubber components are blended with a polyester to yield the final soft blend. As before the relative amounts of all components is maintained, except that the plastic is a polyester instead of a nylon.

The components, and relative amounts of each, in Blend A are tabulated below:

| | |
|---|---|
| Vamac, VMR-6796 | 50 |
| Hytemp 4051CG | 50. |
| Vamac Curative, Diak #1 | 0.5 |

-continued

| | |
|---|---|
| inert organic filler | 12 |
| TOTAL | 112.5 |

The components, and relative amounts of each, in Blend B are tabulated below:

| | |
|---|---|
| Blend A | 112.5 |
| PBT, Celenex 2002 | 66.7 |
| ACM Curative, Hytemp SC-75 | 3.5 |
| inert organic filler | 4. |
| Naugard 445 | 2. |
| Kemamide S221 | 2. |
| TOTAL | 190.7 |

The properties of Blend B are tabulated below:

| | |
|---|---|
| Ultimate Tens. Strength (psi) | 985 (6.8 MPa) |
| Elongation at Break (%) | 73 |
| 100% Modulus (psi) | — |
| Tension Set (%) | — |
| Hardness (Shore A/D) | 43D |
| Oil Swell (%) 70 hrs @ 125° C. | 7.1 |
| Compression Set (%) 70 hrs @ 150° C. | 79.7 |

The components, and relative amounts of each, in Blend C are tabulated below:

| | |
|---|---|
| Blend A | 112.5 |
| PBT, Celenex 2002 | 25. |
| ACM Curative, Hytemp SC-75 | 3.5 |
| inert organic filler | 4. |
| Naugard 445 | 2. |
| Kemamide S221 | 2. |
| TOTAL | 149. |

The properties of Blend C are tabulated below:

| | |
|---|---|
| Ultimate Tens. Strength (psi) | 608 (4.2 MPa) |
| Elongation at Break (%) | 200 |
| 100% Modulus (psi) | 486 (3.4 MPa) |
| Tension Set (%) | 12 |
| Hardness (Shore A/D) | 73A |
| Oil Swell (%) 70 hrs @ 125° C. | 9.5 |
| Compression Set (%) 70 hrs @ 150° C. | 53.9 |

EXAMPLE 4

In a manner analogous to that described above for Example 3, the same components are blended in the final soft blend, in the same relative amounts plastic:rubber= 20:80. However, using a lower relative amount of the polyester in a 30/70 polyester/rubber mixture to form the intermediate hard blend in stage 2, demonstrates that forming a softer intermediate hard blend now results in a slightly softer final blend, the remaining properties being substantially the same.

The components, and relative amounts of each, in Blend A are tabulated below:

| | |
|---|---|
| Vamac, VMR-6796 | 50 |
| Hytemp 4051CG | 50 |
| Vamac Curative, Diak #1 | 0.5 |

-continued

| | |
|---|---|
| inert organic filler | 12 |
| TOTAL | 112.5 |

The components, and relative amounts of each, in Blend B are tabulated below:

| | |
|---|---|
| Blend A | 112.5 |
| PBT, Celenex 2002 | 42.9 |
| ACM Curative, Hytemp SC-75 | 3.5 |
| inert organic filler | 4. |
| Naugard 445 | 2. |
| Kemamide S221 | 2. |
| TOTAL | 166.9 |

The properties of Blend B are tabulated below:

| | |
|---|---|
| Ultimate Tens. Strength (psi) | 697 (MPa) |
| Elongation at Break (%) | 166 |
| 100% Modulus (psi) | 657 (4.5 MPa) |
| Tension Set (%) | 15 |
| Hardness (Shore A/D) | 86A |
| Oil Swell (%) 70 hrs @ 125° C. | 11.6 |
| Compression Set (%) 70 hrs @ 150° C. | 70.8 |

The components, and relative amounts of each, in Blend C are tabulated below:

| | |
|---|---|
| Blend A | 112.5 |
| PBT, Celenex 2002 | 25. |
| ACM Curative, Hyteemp SC-75 | 3.5 |
| inert organic filler | 4. |
| Naugard 445 | 2. |
| Kemamide S221 | 2. |
| TOTAL | 149. |

The properties of Blend C are tabulated below:

| | |
|---|---|
| Ultimate Tens. Strength (psi) | 625 (4.3 MPa) |
| Elongation at Break (%) | 194 |
| 100% Modulus (psi) | 469 (3.2 MPa) |
| Tension Set (%) | 10.3 |
| Hardness (Shore A/D) | 63A |
| Oil Swell (%) 70 hrs @ 125° C. | 11 |
| Compression Set (%) 70 hrs @ 150° C. | 69.6 |

EXAMPLE 5

Comparison of blends made by Horrion's two-stage process, and the three-stage process:

In the following two methods for making a final blend of two curable rubbers and a nylon, the same amounts of each component are present in each final blend, and each is made in an extruder with appropriate venting, except that the Horrion blend is made in two stages (as illustrated in FIG. 1), and the blend of this invention is made in an additional third stage which is provided by re-extruding the second stage intermediate hard blend to which additional cured rubber concentrate is added (as illustrated in FIGS. 2A and 2B).

In a manner analogous with that described in Example 1, Vamac GLS which is a copolymer of about 50 mole % ethylene, 45 mole % methyl acrylate, and about 5 mole % acrylic acid, is blended with an equal portion by weight of Hytemp 4051CG (copolymer of ethyl acrylate/vinyl chloroacetate, weight ratio about 95:5). The mixture is cured in a Banbury mixer with Diak #1 and an inert organic filler while the evolved gases are removed to yield Blend A.

Blend A is used to form Blend H (the final blend sought to be made) by dynamically blending with Ultramid B3 nylon 6, ratio of Blend A: Ultramid B3=4.5 in the two-stage Horrion process. Blend A is also used to form Blend B (the intermediate hard blend) for the three stage process using more than twice the amount of nylon 6 relative to the amount of Blend A used (ratio of Blend A: Ultramid B3=1.69), and no plasticizer to make the intermediate fully dense hard blend.

The components of Blend H and Blend B are as follows:

|  | Blend H | Blend B |
| --- | --- | --- |
| Blend A | 112.5 | 112.5 |
| Nylon 6, Ultramid B3 | 25. | 66.7 |
| Hytemp SC-75 | 3.5 | 3.5 |
| inert organic filler | 4. | 4. |
| Naugard 445 | 2. | 2. |
| Kemamide S221 | 2. | 2. |
| Santicizer 79TM | 10. | 0. |
| TOTAL | 159. | 190.7 |

Blend H is dynamically vulcanized in the presence of a tertiary amine curative (ACM curative Hytemp SC-75), lubricant/filler, processing aid and antioxidant, in a twin-screw extruder to yield a plastic/rubber ratio of 20/80. Pellets of Blend B (formed in the second stage) are fully dense and have hardness greater than 40 Shore D. When Blend H is pelletized for use in an injection molding machine, the pellets are spongy and wet typically requiring from about five to ten times longer than the time required to dry pellets of Blend B or C (see below) under identical drying conditions.

In a manner analogous to that described in Example 1, the intermediate hard Blend B is mixed with an additional amount of Blend A and dynamically vulcanized in the presence of ACM curative Hytemp SC-75, lubricant/filler, processing aid and antioxidant, in a twin-screw extruder, to produce a soft Blend C. Blend C yields a plastic/rubber ratio of 20/80 which provides fully dense pellets.

The components, and relative amounts of each, in Blend C are tabulated below:

| Blend A | 112.5 |
| --- | --- |
| Nylon 6, Ultramid B3 | 25. |
| Hytemp SC-75 | 3.5 |
| inert organic filler | 4. |
| Naugard 445 | 2. |
| Kemamide S221 | 2. |
| Santicizer 79TM | 10. |
| TOTAL | 159. |

The properties of Blend H and Blend C are tabulated below:

|  | Blend C | Blend H |
| --- | --- | --- |
| Ultimate Tens. Strength (psi) | 972 (6.7 MPa) | 856 (5.9 MPa) |
| Elongation at Break (%) | 184 | 248 |
| 100% Modulus (psi) | 682 (4.7 MPa) | 595 (4.17 MPa) |
| Pellet quality | fully dense | spongy |
| Hardness (Shore A) | 76 | 61 |
| Oil Swell (%) 70 hrs @ 125° C. | 7 | 6.7 |
| Compression Set (%) 70 hrs @ 150° C. | 70 | 63 |

We claim:

1. A process for making a vulcanized blend of an engineering thermoplastic resin and at least two, first and second, curable acrylate rubbers in successive stages, comprising,
   (i) in a first stage, curing a first curable acrylate rubber with a first curative in a first condensation reaction, in the presence of a second curable acrylate rubber unreactive with said first curative, to yield a first vulcanizate, while concurrently removing evolved gases;
   (ii) in a second stage, curing said second rubber with a second curative in a second condensation reaction in the presence of said thermoplastic resin and said first vulcanizate while concurrently removing evolved gases, to yield an intermediate fully dense hard blend having a hardness of at least 40 Shore D; and thereafter,
   (iii) in a third stage, curing an amount of additional curable rubber with additional curative in a succeeding condensation reaction, in the presence of said intermediate fully dense hard blend, while concurrently removing evolved gases, to yield a final "soft" blend having a hardness less than 30 Shore D and substantially free of plasticizer.

2. The process of claim 1 wherein the amount of said thermoplastic resin is sufficient to provide a continuous phase in which vulcanizate is the dispersed phase, and said hardness of said intermediate hard blend is controlled by the relative amounts of said second rubber and said plastic present when said second rubber is vulcanized.

3. The process of claim 1 wherein, in said third stage, said additional curable rubber is a blend of said first and second curable rubbers and said additional curative includes curatives for both said first and second rubbers.

4. The process of claim 1 wherein, in said third stage, said additional curable rubber is the same as said second curable rubber and said additional curative is said second curative.

5. The process of claim 1 wherein, in said third stage, said additional curable rubber is a third rubber different from said first and second curable rubbers and said additional curative is for said third rubber.

6. The process of claim 2 wherein said second rubber in said first stage is a minor proportion by weight relative to the total amount of rubber in said final blend.

7. A vulcanized blend of an engineering thermoplastic resin and at least two, first and second, curable acrylate rubbers in three stages, formed by
   (i) curing a first curable acrylate rubber with a first curative in a first condensation reaction, in the presence of a second curable acrylate rubber unreactive with said first curative, to yield a first vulcanizate, while concurrently removing evolved gases;
   (ii) curing said second rubber with a second curative in a second condensation reaction in the presence of said thermoplastic resin and said first vulcanizate while concurrently removing evolved gases, to yield an intermediate fully dense hard blend having a hardness of at least 40 Shore D; and thereafter,
   (iii) curing an amount of additional curable rubber with additional curative in a succeeding condensation reaction, in the presence of said intermediate fully dense hard blend, while concurrently removing evolved gases, to yield a final "soft" blend having a hardness less than 30 Shore D and substantially free of plasticizer.

8. The blend of claim 7 having a hardness in the range from about 30 Shore A to 30 Shore D.

9. The blend of claim 8 wherein the amount of said thermoplastic resin is sufficient to provide a continuous phase in which vulcanizate is the dispersed phase, and said hardness of said intermediate hard blend is controlled by the relative amounts of said second rubber and said plastic present when said second rubber is vulcanized.

10. The blend of claim 8 wherein, in said third stage, said additional curable rubber is a blend of said first and second curable rubbers and said additional curative includes curatives for both said first and second rubbers.

11. The blend of claim 8 wherein, in said third stage, said additional curable rubber is the same as said second curable rubber and said additional curative is said second curative.

12. The blend of claim 8 wherein, in said third stage, said additional curable rubber is a third rubber different from said first and second curable rubbers and said additional curative is for said third rubber.

13. The blend of claim 9 wherein said second rubber in said first stage is a minor proportion by weight relative to the total amount of rubber in said final blend.

14. The blend of claim 8 having a hardness in the range from 40 Shore A to 90 Shore A.

* * * * *